(12) United States Patent
Armstrong (10) Patent No.: US 7,243,050 B2
(45) Date of Patent: Jul. 10, 2007

(54) DEVICES AND SYSTEMS FOR REMOTE AND AUTOMATED MONITORING AND CONTROL OF WATER REMOVAL, MOLD REMEDIATION, AND SIMILAR WORK

(76) Inventor: Jay T. Armstrong, 2241 White Oak, Wichita, KS (US) 67207

( * ) Notice: Subject to any disclaimer, the term of this patent is extended or adjusted under 35 U.S.C. 154(b) by 0 days.

(21) Appl. No.: 11/073,172

(22) Filed: Mar. 5, 2005

(65) Prior Publication Data
US 2006/0217934 A1    Sep. 28, 2006

(51) Int. Cl.
G06F 15/00    (2006.01)
G06F 11/30    (2006.01)

(52) U.S. Cl. ......................................... 702/188; 702/182
(58) Field of Classification Search ................ 702/188, 702/182, 186, 130, 132, 187, 184, 185; 340/310.01, 340/333, 531, 539.11; 713/300, 310
See application file for complete search history.

(56) References Cited

U.S. PATENT DOCUMENTS

| | | | |
|---|---|---|---|
| 6,450,411 B1 | 9/2002 | Rash et al. | |
| 6,567,769 B2 | 5/2003 | Chang | |
| 6,646,564 B1 * | 11/2003 | Azieres et al. | 340/679 |
| 6,837,095 B2 * | 1/2005 | Sunshine et al. | 73/23.2 |
| 6,873,936 B2 | 3/2005 | Reel et al. | |
| 6,978,631 B2 | 12/2005 | Fuller | |
| 6,995,676 B2 | 2/2006 | Amacher | |
| 7,009,510 B1 | 3/2006 | Douglass et al. | |
| 7,020,701 B1 | 3/2006 | Gelvin et al. | |
| 7,026,929 B1 | 4/2006 | Wallace | |
| 7,026,941 B1 | 4/2006 | Anderson | |

* cited by examiner

Primary Examiner—Bryan Bui
(74) Attorney, Agent, or Firm—Patrick D. Kelly (57) ABSTRACT

Electronic devices, systems, and methods are disclosed for remote and/or automated monitoring of temperature, humidity, or other factors in a building during a remediation project, such as after a flood or mold infestation. These devices comprise sensors devices that can be distributed around a room or building, for transmitting data to a processor such as a laptop computer. Using telephone, cell phone, or internet connections, the processor can transmit compiled data to a website or remote computer, for analysis and use by a project supervisor. Sensor-switch devices also are disclosed for turning fans, dehumidifiers, or other equipment on or off. Using a telephone, cell phone, or internet connnection, a project supervisor at any location can download information, obtain current status information, and turn equipment on or off as needed.

12 Claims, 4 Drawing Sheets

DEVICES AND SYSTEMS FOR REMOTE AND AUTOMATED MONITORING AND CONTROL OF WATER REMOVAL, MOLD REMEDIATION, AND SIMILAR WORK

FIELD OF THE INVENTION

This invention is in the field of electronic monitoring devices, and involves devices that can assist in cleanup and remediation of a building that has been damaged by a flood, mold infestation, or similar problem involving excessive water or moisture.

BACKGROUND OF THE INVENTION

In America and elsewhere, serious damage is caused each year to many buildings, and severe burdens are placed on the owners, occupants, and users of those buildings, by problems relating to water. The types of problems that can lead to water damage include but are not limited to flooding, bursting of water pipes due to freezing, corrosion, or other problems, water seepage into buildings (and especially basements) after rains, water condensation on cold pipes or other surfaces, punctures in dryer vents or other types of ducting, etc. Any of these types of events or conditions can lead to structural damage to wood, dry wall, or other materials, the growth of noxious colonies of mold of other microbes, the formation of foul odors, etc., and those problems in turn can trigger asthma attacks, respiratory problems, and other health problems.

If flooding, a burst pipe, or other problem causes water intrusion inside a building, or if excessive moisture buildup is discovered, the remediation process most commonly involves six major stages. First: the source of the problem must be identified, and repaired or otherwise addressed. Second: mechanical means (such as mopping, wet/dry vacuuming, etc.) are used to remove the bulk of the water. Third: any relatively inexpensive materials that have been damaged by the water (such as carpet, paneling, dry wall, etc.) usually are removed (and are either discarded or thoroughly dried, exposing the underlying structural supports, which typically include beams, studs, door or window casings, concrete floors or walls, and other structural items. Fourth: devices such as fans or blowers, portable dehumidifiers, etc., are usually placed inside the affected room(s), to accelerate the drying process. Fifth: to the extent possible, various affected surfaces usually are cleaned with a disinfectant or similar antimicrobial agent, to kill as many of the remaining microbes as possible. Sixth: dry wall, paneling, carpeting, or similar items are replaced, to return the structure to a fully habitable condition.

It should be noted that terms such as "room" and "building" are used broadly, and are not be limited by arbitrary distinctions. In general, the term "room" refers to any particular enclosed or semi-enclosed volume-containing area, inside a building. For example, an entire basement or any portion thereof might be regarded as a room, and the entire enclosed area of a large warehouse might similarly be regarded as a room, if conditions warrant and depending on the layout of a building. Similarly, a crawlspace, storage area, or other enclosed area inside a building that needs to be cleaned out might also be regarded as a "room" under this broad use of the world. Similarly, "building" can include any type of enclosed structure that is used to enclose and/or shelter people or contents, if such structure is of a type that may need water-damage remediation as disclosed herein.

As used herein, "fan" includes any powered device used primarily for blowing or otherwise moving air, including devices that might also be called blowers, compressors, etc. The term "dehumidifier" includes any type of device that draws, blows, or otherwise moves moisture-laden air through a condensing unit. Typically, the air passes across exposed tubes carrying cold refrigerant, and moisture condenses on the cold surfaces of the tubes and any additional fins, baffles, etc. The condensate drips down a vertical surface until it reaches a low point, then it falls into a collection basin. In commercial units, the basin usually is pumped out through a hose, into a drain or tank, under the control of a sensor that turns on a pump when the basin becomes full.

Many remediations are carried out by professional contractors, who specialize in performing such work efficiently and thoroughly, to minimize the risk of future problems. When contractors are involved, it usually is necessary or at least very helpful for them to monitor and keep dated records of the conditions in any rooms that are being remediated, to determine the status and progress of the drying process, and to help schedule and organize each stage of work that will be required, as listed above.

Relative humidity, absolute humidity, and air temperature are almost always monitored, since they are crucial factors in determining the progress of a water remediation effort. Since they involve measuring the air, those parameters can be referred to as "atmospheric conditions", if desired, so long as it is understood that the air that is being measured is inside a room, rather than outdoors. Most commonly, a worker measures them by using a hand-held electronic sensor that can provide fairly rapid digital readouts on a display panel. Such monitoring usually is done only once a day at the start of an operation, to establish starting or "baseline" levels and an awareness of how things are progressing, and how much still needs to be done. As each stage of remediation nears completion, monitoring often needs to be performed more frequently, such as twice or even several times a day. The data that is collected using such hand-held electronic sensors usually are recorded and documented manually, by a worker, such as by using a pen or pencil to fill in the blanks on a worksheet.

This approach to monitoring the atmospheric conditions in a room or building during water remediation is labor-intensive, and is relatively time-consuming, expensive, distracting, and burdensome. In addition, it becomes even more troublesome if a job site is a long distance away from a contractor's office (which happens fairly often, especially in rural areas). Also, the reliability of the data is subject to the sampling technique(s) and skill of the worker who handles the electronic monitoring device, and it also depends on that worker's willingness to spend extra time and effort to fill out a worksheet, each and every time a new set of readings is taken. Since most workers who do that type of work are not especially fond of handling and filling out that kind of paperwork, the data are not always reliably gathered and recorded, and the data also can be (i) limited by the capabilities and memory capacity of the portable sensor, and/or (ii) rendered erroneous and misleading, if a portable electronic device is handled roughly, or if it gradually drifts out of calibration.

A worker at a job site usually will also be assigned to check the operating status of any electrical equipment (fans or blowers, portable dehumidifiers, space heaters, etc.) being used at that site. However, except for basic repairs (such as checking to make sure any power cords are fully plugged in, any circuit breakers have not been tripped, etc.), such workers usually are not trained, qualified, or equipped to repair that type of electrical equipment if it malfunctions.

In addition, problems such as tripping of a circuit breaker (thereby shutting down power equipment that is crucial to the remediation) often do not occur while a worker is present, and it should be noted that such occurrences are fairly common, if a flood or burst pipe allowed water to permeate into sockets, switches, junction boxes, or other wiring or appliances. Similarly, regardless of any warnings and admonitions that may be given to a homeowner in the most direct, clear, and blunt language possible, there will always be a select few homeowners who will decide to turn off the fans and blowers when it's time to go to bed, because the equipment is making too much noise. Those types of shutdowns, if not detected quickly, can lead to extended periods of lost and wasted time, which will slow down a remediation, and which can create serious problems and disputes between homeowners, contractors, and insurance companies.

Accordingly, one object of this invention is to disclose an improved system that will allow automated remote monitoring of atmospheric conditions inside a water-damaged building, using portable sensor/processor/transmitter devices that can be: (i) easily installed and positioned in a room or other indoor environment, at the start of a remediation operation, and (ii) easily removed and taken to the next job site, as soon as the remediation operation has been completed.

Another object of this invention is to disclose an improved system that will allow automated remote gathering and recording of atmospheric data from inside a water-damaged room, using sensor devices that can be positioned at more than one location inside a room or building.

Another object of this invention is to disclose an improved system that will allow data concerning atmospheric conditions in a building that is being remediated to be stored onsite for any desired period of time, and transmitted whenever desired (such as by telephone, wireless RF transmission, etc.), such as at predetermined times, or when activated by a triggering signal from a control device that is being used to gather data from a number of sensor/processor/transmitter devices.

Another object of this invention is to disclose an improved system that will extensively automate the gathering and processing of data on atmospheric conditions inside numerous water-damaged buildings that are being remediated by a contractor, using a system of multiple job-site sensors that interact with a job-site processor which can collect data at the job site and then intermittently transmit the data to a website or a remote computer.

Another object of this invention is to disclose an improved system that can automate the gathering and processing of data on atmospheric conditions inside numerous water-damaged buildings that are being worked on by one or more contractors, and that will allow data on atmospheric conditions in any of those buildings to be retrieved and analyzed by a technician from any site, using internet, telephone, or similar access.

Another object of this invention is to disclose an improved system that will allow a remediation worker to be automatically contacted when a significant change (such as, for example, loss of power, failure of a machine, or atmospheric moisture levels dropping below a targeted level) is detected by one or more sensors within a building bring remediated.

These and other objects of the invention will become more apparent through the following summary, drawings, and description.

SUMMARY OF THE INVENTION

Electronic devices and methods are disclosed that will enable remote and/or automated monitoring of temperature and humidity inside a building during a water remediation operation, such as after a flood, burst pipe, or discovery of a large mold colony. The electronic devices comprise a set of sensor/processor devices that can be placed in a room or building that is being dried out and remediated, and that can measure temperature and humidity inside the room or building. These devices will also comprise, or be coupled to, a communication device that will allow a technician to obtain recently gathered data via suitable remote means (such as by telephone or internet contact, via a radiofrequency transmission, etc.), without having to travel to the site. A processor at a remediation site can gather data from a plurality of sensors that are positioned in different locations around a room or building, if desired, and a coordinating data collection and processing system (which can be carried around on a laptop computer, if desired) can gather data that is being gathered at any number of job sites, and can organize and distinguish the different data sets from each site.

Methods are also disclosed for monitoring the status and progress of a water remediation job, using the electronic devices and systems disclosed herein.

DETAILED DESCRIPTION

As briefly summarized above, electronic devices and systems are disclosed that will enable automated and/or remote measuring and monitoring of air temperature and humidity levels in a water-damaged building. A simplified schematic of such a system, represented by callout numbers 100A (for a hard-wired system that uses telephone lines) or 100B (for a wireless system that uses cell-phone or other radiofrequency transmission), is provided in FIG. 1.

Figure 1:
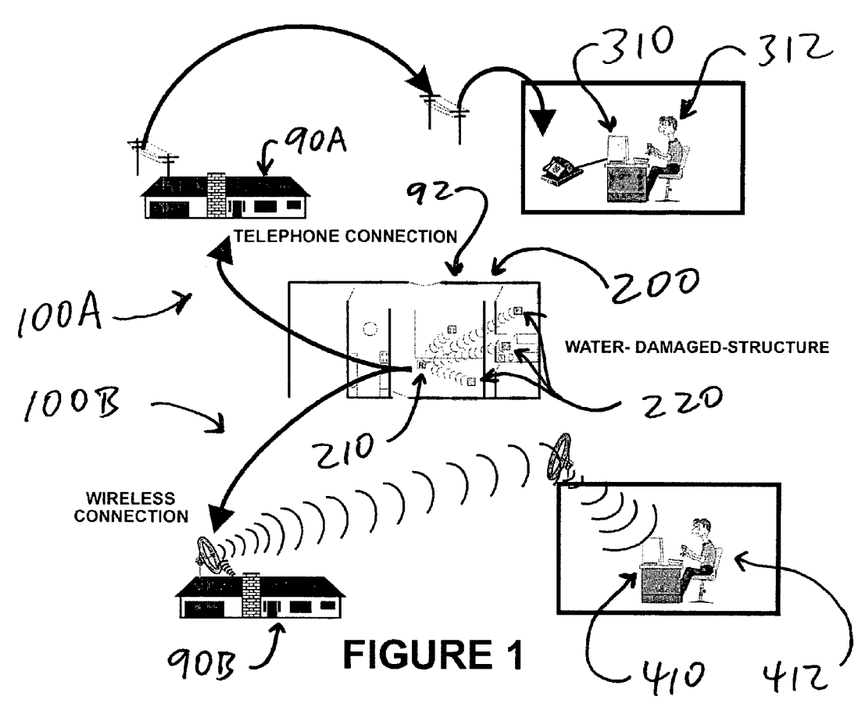
FIG. 1 depicts a home that requires remediation of a flooded basement, showing a sensor array and processor that have been placed in the basement, and two alternative means (hard-wired, and wireless) for transmitting data from the processor to a remote computer.
Figure 2:
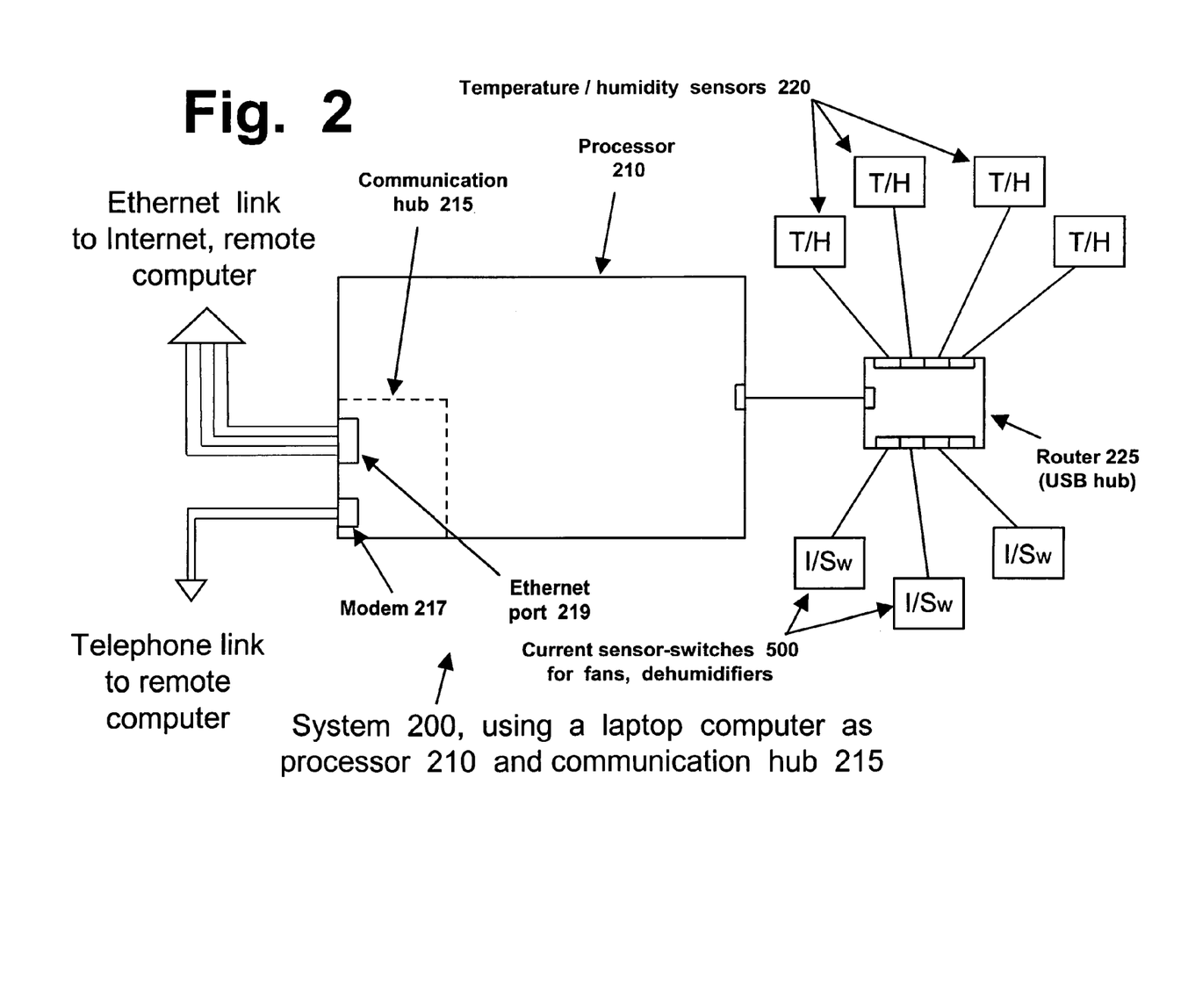
FIG. 2 depicts a laptop computer being used as the on-site processor, coupled to a "universal serial bus" hub that enables the processor to communicate with numerous sensors.

FIG. 1 depicts a home 90 that has been damaged by a flood, burst pipe, a major mold infection, or other water intrusion or damage. Callout number 90A represents home 90 in which a hard-wired telephone connection is being used, while callout number 90B represents home 90 where a wireless system is being used. Floorplan 92 represents a basement or ground floor having several different rooms that require remediation. Sensor and transmitter system 200, shown in more detail in FIG. 2, has been installed at the job site. The system 200 which will be temporarily installed at the remediation site (also called the job-site) comprises the following components:

1. a device referred to herein as processor 210, which preferably and in the discussions below is a laptop or notebook computer, but which alternately might a dedicated microprocessor, "personal digital assistant" (PDA), or similar device that can be programmed with specialized software as described below;

2. a device referred to herein as "communication hub" 215, which provides an interface that allows processor 210 to transfer data to a remote computer owned by a contractor who is carrying out the remediation. If a laptop or notebook computer is used as processor 210, it typically will provide all necessary components for at least some types of data transfer, since nearly any modern or recent laptop or notebook computer will contain at least two and usually three types of communication ports. Modem 217 (for creating a "hard-wired" telephone connection) and "ethernet" port 219 (for creating a high-speed Internet connection), illustrated in FIG. 2, are present in nearly all modem or recent laptop or notebook computers. In addition, most laptop or notebook computers also contain a "PCMCIA" card slot (not depicted in FIG. 2), which will accept a "wireless interface" card, which (when inserted into the card slot) will allow a computer to interact with either a wireless local router or network, or in some cases with certain types of cell phones and/or PDA's. These terms and devices are well-known to those skilled in the art, and are described, explained, and illustrated on numerous Internet websites.

Accordingly, in FIG. 2, communication hub 215 is depicted as part of laptop computer 210, by means of a dashed line inside the processor (computer) 210, to indicate that hub 215 is actually contained within and is part of the laptop computer.

However, it should be noted that a separate device can be provided and used as a communication hub, if desired, especially if a "dedicated microprocessor" or PDA-class device (rather than a full-powered computer with several built-in data transfer devices) is used as the job-site processor 210.

It should also be noted that in some situations, a contractor may be very reluctant to leave a complete laptop computer at a job site that will be unattended, because of the risk of theft or breakage. Accordingly, serious attention should be given not just to microprocessors and PDA-type devices, but also to "sub-laptop" devices, commonly referred to as "Tablet PC" devices or other comparable or suggestive terms, and to any additional types of computerized devices that are commercialized in the future, such as "expanded gaming" devices that will be comparable to Nintendo Game-Boy devices except larger and with more elaborate screens and input/output capabilities. Similarly, it should be noted that any electronic or computerized device can be placed in various types of safes, lockboxes, cases, etc., to reduce the risks of theft and tampering.

Job-site processor 210 must also be provided with means to interact with several sensors that will be set up at a remediation site. Preferably, at least two different types of sensors should be provided.

The first type of sensor 200 must be able to measure at least one type of parameter that will change, in a desirable and generally predictable manner, during the course of the work at the job site. For example, remediation after a flood, burst pipe, or discovery of a major and noxious mold colony that was being supported by a leaking roof, wall, pipe, or other structure or device, will focus primarily on removing water, in a manner that will reduce the humidity inside a room or building. To measure the actual extent and progress of that desired reduction in humidity, temperature as well as "absolute humidity" levels inside a building must be measured (the temperature measurement is not always essential; however, it can allow an "absolute humidity" level to be converted to a "relative humidity", which tends to be more revealing of actual progress. Therefore, if the work being done involves water removal and drying, sensors 200 should be able to measure temperature and humidity (and may also be able to measure various other parameters as well, if desired). Such sensors are commercially available, such as the PASPORT™ PS2124 temperature, humidity, and dew-point sensor, sold by Pasco (www.pasco.com). This unit contains the components necessary to transmit data to a receiver, using radiofrequency (RF) signals, using a Pasco system called XPLORER DATALOGGER™.

Various other types of sensors can alternately or additionally be used, if desired, for other types of work; as just one example, if airborne levels of dust, or one or more potentially noxious or explosive gases, must be brought down to acceptable levels before workers can safely enter a building, sensors that can measure such parameters are known and available.

Temperature and humidity sensors (and other types of sensors) that have RF signal-transmitting capability include and utilize a "unique address" system, most commonly a system known as the "MAC" address system. These devices and protocols are well known, and can interact with receiver and/or transmitter systems that are available from companies such as Radiotronix (www.radiotronix.com). These "unique address" systems allow a central unit to identify and correlate each "data set" that is received from any sensor as being from a certain specific sensor, regardless of how many sensors may be active at or near the place of operation.

Figure 4:
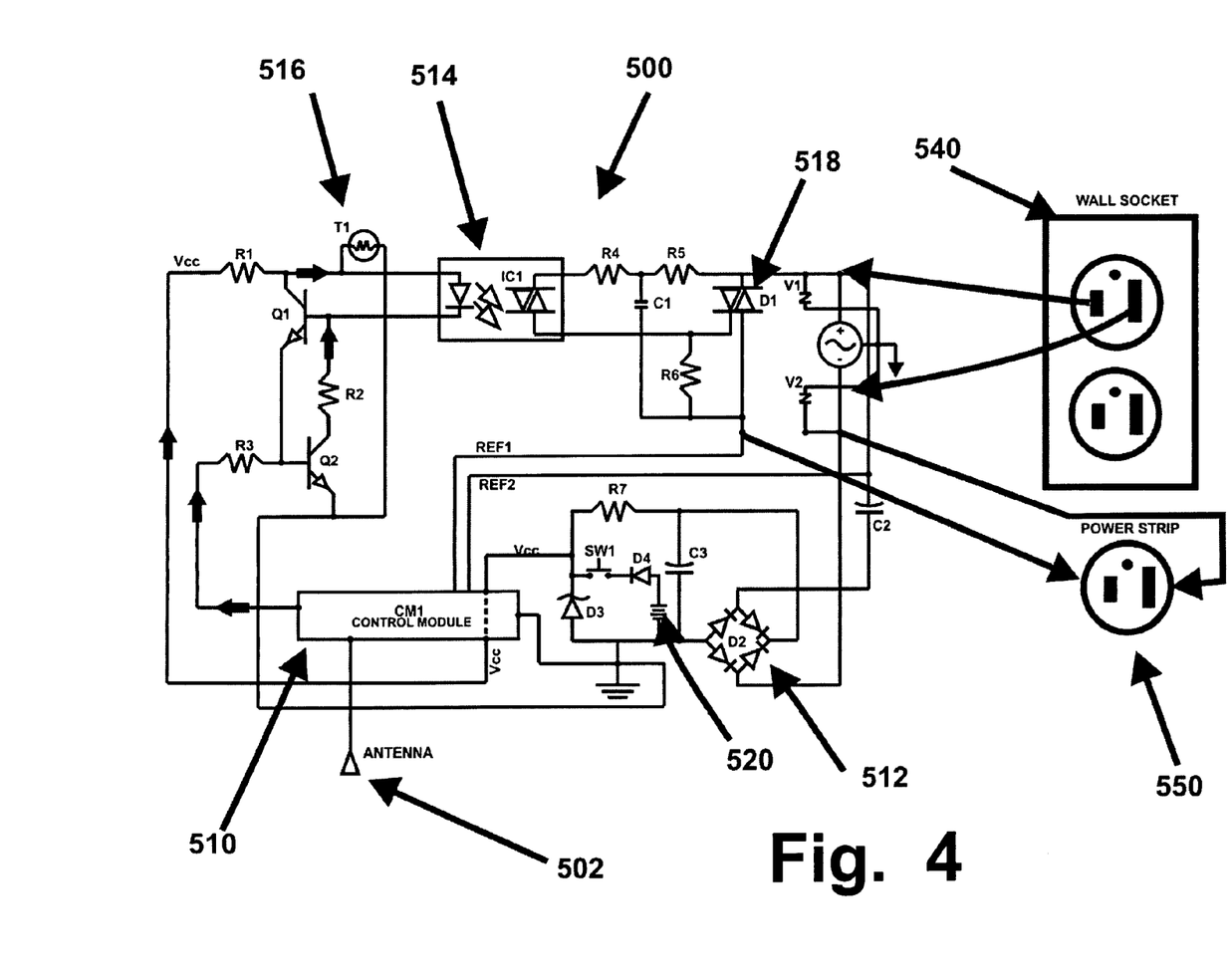
FIG. 4 is a circuit diagram of a sensor-switch device with a programmable microprocessor, which can: (i) detect how much current is passing through a powered device, such as a fan or dehumidifier, at any given moment; (ii) transmit that information to the main processor at a job site; and, (iii) turn the powered device on or off, in response to various detected events, or in response to signals received from the main jobsite processor, including signals that may be initiated by a supervisor working at a remote location.

A second type of sensor is provided as part of sensor-switch 500, which is optional but strongly preferred and which is illustrated in FIG. 4 and discussed below, will provide means for determining whether a certain fan, blower, dehumidifier, or other piece of equipment is running, or turned off. This can be done by: (1) plugging a sensor device that contains a current meter (a device that measures electrical current, usually expressed as watts and abbreviated as I) into a wall outlet, extension cord, power strip, or other outlet that will provide 110 or 220 volt alternating current; and, (2) plugging a fan, dehumidifier, or other power equipment into an outlet that is provided and controlled by the sensor-switch 500. If and when a fan, dehumidifier, or other device is turned on and running, the current that powers the device must flow through sensor-switch 500, allowing it to measure the current. Accordingly, each sensor-switch 500 can indicate whether a certain piece of equipment is running, or not running. In addition, if a current load become unusually high (which indicates that a problem may have arisen or may be approaching), a sensor-switch 500 can trigger an alert or alarm signal, which can activate a preprogrammed response (such as, for example, turning off the power equipment to prevent possible damage, sending an alarm signal to a remote computer or pager, and activating one or more camera or video devices that will begin recording and storing pictures of the job site, to allow a contractor to use a remote computer to see what is happening at the job site).

In addition, sensor-switch devices 500 preferably should be provided with on/off switching capability that can be controlled by processor 210. This can allow a worker at a remote location, working through processor 210, to turn any specific fan or dehumidifier on or off. For example, if data from a sensor 220 indicate that the humidity level in one room in a basement has dropped to a targeted level, while data from other sensors indicate that other rooms still need more drying, system 200 can enable the fan and/or dehumidifier in the "sufficiently dry" room to be turned off, automatically, while fans and dehumidifiers in other rooms keep running. Using USB connections (which can carry signals in both directions), this type of controlled switching can be done automatically by the on-site processor 210, or it can be done by a technician operating a remote computer, telephone, cell phone, or other device that can send a control signal to processor 210. As a general rule, the system should be programmed in a way that will allow a human operator, using his or her best judgment (based on all data, pictures, or other transmitted evidence, and also taking into account any personal inspections, knowledge of the job site, recommendations by workers or dwellers, or other available information), to override any action that has been or would be taken automatically by processor 210.

As indicated in FIG. 2, a single processor 210 can interact with multiple sensors 220 and sensor-switches 500, by means of an on-site router or hub device 225, or by means of a wireless network.

If a hard-wired system is preferred, the "universal serial bus" (USB) system has been designed to allow a computer to interact with up to 128 different peripheral devices, all at the same time and while also supplying low-voltage power (usually 5 volts) to drive many types of devices that do not require additional power sources. As a result, USB ports have become standard connectors for keyboards, pointers, scanners, printers, external drives, memory devices, camera and video devices, and a wide variety of other "peripheral" devices that can be coupled to a computer via a data cable. Since USB ports have been adapted for use by so many types of devices, most recent and modern laptop or notebook computers provide at least two, commonly three, and frequently four USB ports built into the computer, and any of those USB ports can also allow an inexpensive "USB hub" (or router) to be plugged in, to provide multiple additional USB ports that will be easily accessible on a small device that can be placed in any convenient location. Accordingly, FIG. 2 depicts a USB hub 225 that will allow up to 8 different sensors, sensor-switches, camera devices, or other devices to communicate (in both directions) with processor 210.

Since USB connections also allow signals to be sent from processor 210 to each of the sensors 220, processor 210 can "poll" each of the sensors 220, at any desired frequency or interval (such as, for example, once every four hours when a job first starts, increasing to hourly polling when "target drying levels" are being approached), to collect data from the sensors. In addition, the software can be programmed to allow a technician, supervisor, or other worker at a remote site to run a "check now" routine in processor 210, at any desired moment, to allow processor 210 to obtain up-to-the-minute data from any or all of sensors 220 or sensor-switches 500.

Alternately, devices for creating wireless local networks that can accomplish the same results are known to those skilled in the art of computer system design, and can be created using equipment that is known and available.

Regardless of whether a hard-wired or wireless system is used, the software that is used to run system 200 can be programmed to cause processor 210 to initiate any type of desired routine, when processor 210 detects that one or more "target drying levels" are being approached (or have been reached) by one or more sensors 220. As just one example, when a relative humidity level of 110% of a target level is reached by a certain sensor, processor 210 can begin sending hourly alerts to a remote computer, or to a paging device carried by a project worker or supervisor. If no action is taken in response, then when the target level is reached, processor 210 can be programmed to shut off a certain fan. If desired, it can also be programmed to "poll" that sensor again, every 15 minutes for the next few hours, to determine whether the humidity went back up after the fan was turned off (and if that happened, the processor can turn the fan back on again).

The processor, sensor, and hub arrangement in FIG. 2 and discussed herein is merely exemplary and illustrative of a relatively straightforward system using inexpensive and readily-available hardware, and the illustrated example is not limiting. Those skilled in the art will recognize various alternatives and options, including systems and setups that may involve one or more different types of connectors, cables, routers, hubs, sensors, etc., as well as setups that use other types of communication interfaces and/or controls, including interfaces and/or controls that may be more sophisticated and that can offer additional options.

Setup and Operating Steps

Figure 3:
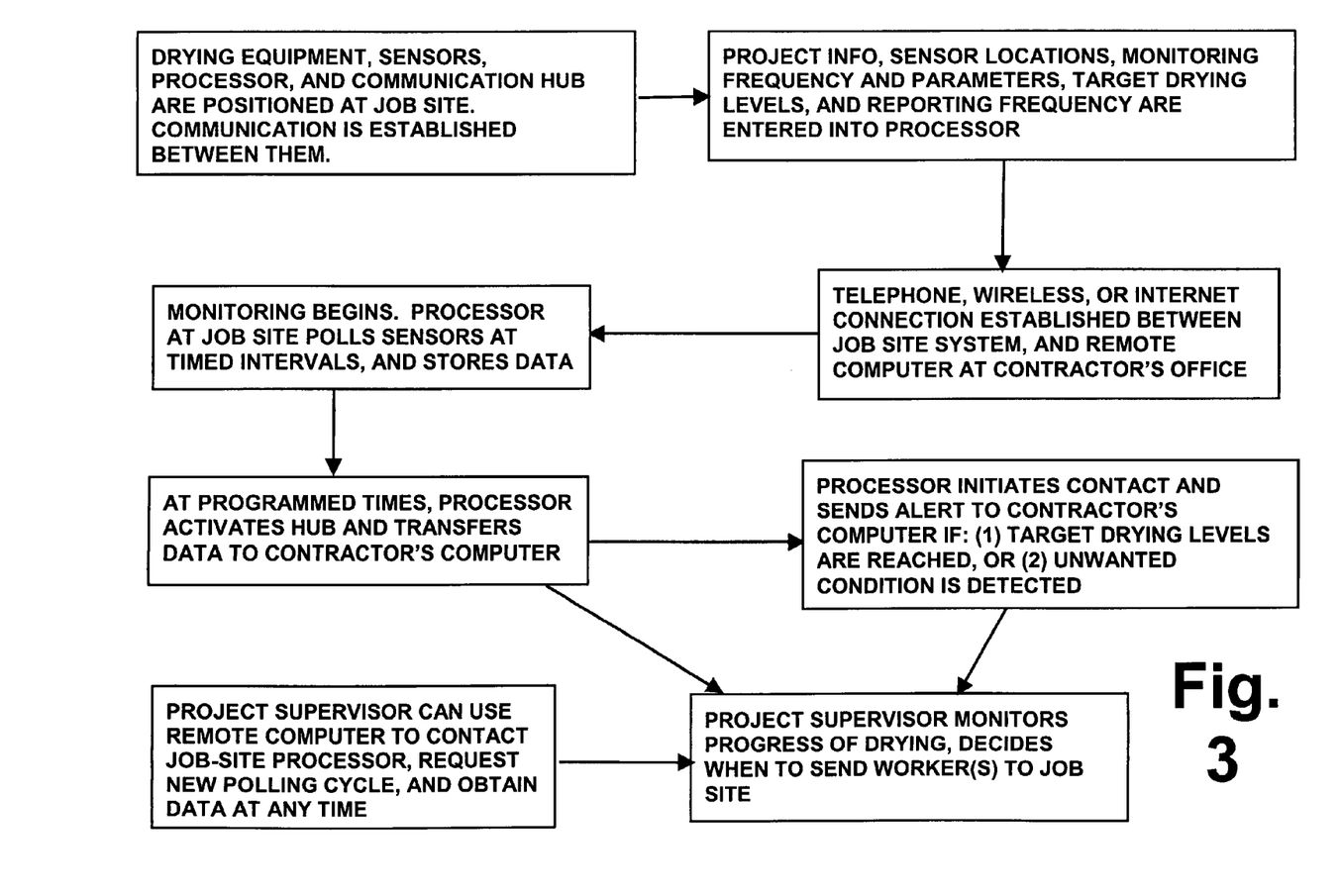
FIG. 3 is a flow chart depicting some of the major steps that will be followed to dry out a flooded building, after standing water has been removed and a contractor can install drying equipment with an electronic monitoring and control system in the building.

FIG. 3 provides a flow-chart, indicating the major steps or substages that can be used to set up and run a system as disclosed herein. These steps can be summarized as follows, in language that will be readily understood by those who actually do this type of work. Each numbered item below corresponds to one of the boxes in FIG. 3.

STEP 1: When a home, office, store, warehouse, or other building suffers a flood, burst pipe, or other problem that requires a drying operation, a contractor will be hired, and the contractor will send one or more workers to the site, in trucks or vans carrying equipment. The workers will assess the site and the damage, and will develop an implement a plan for removing the bulk of the water, using pumps if necessary, usually but not always followed by a combination of mopping and/or wet/dry vacuuming.

At some point during a remediation, enough water will be removed to render it safe, practical, and useful to place one or more fans and/or dehumidifiers in the building, with electrical power cords running to them. When this point is reached, one or more workers install and position the drying equipment, several temperature and humidity sensors, and the processor 210 (and a communications hub or device, if not already present as part of a laptop computer or other processor) at various appropriate locations around the interior of the building. Communication is established between all of the on-site devices, by means such as: (i) running USB cables between various sensors and one or more USB hubs or routers; (ii) getting a wireless local network up and running, inside the building, or utilizing such a network that may already be present; and/or, (iii) coupling various devices to X10 converters, which can transmit and receive data through the power wiring that distributes electricity (i.e., 60-cycle AC power) to various outlets distributed around the building.

STEP 2: When the local system is up and running, and communication has been confirmed between the centralized processor 210 and each and all of the sensors (including any switching sensors that will monitor and control the amount of electrical current going to specific drying devices), the project supervisor will enter various items of information into the software program that is running on the processor. Guided and assisted by prompts and default values, this information will include, for example, items such as the following:

a. A descriptive phrase, the project number, the name of the building owner, or some other unique identifier that will allow a remote computer to identify the source of any data received from each particular site, when multiple projects are active at varous different sites. This is essential, since a contractor who handles this type of work typically will have multiple jobs going at any given time.

b. A brief phrase, code number, or other information that will allow on-site processor 210 to (i) clearly identify each sensor that is active in the building being remediated, and (ii) store any and all data from each particular sensor in a memory storage area that will keep the data separate from data from other sensors.

c. Information on the plans for the remediation effort, including: (i) a monitoring interval frequency, which will control how often the processor 210 will "poll" each of the sensors, to gather and record data from each sensor at that point in time (this interval frequency can change, during the course of the project); (ii) any parameters that will be monitored by the sensors (normally including temperature and absolute humidity as the two crucial parameters, while others are optional); (iii) any additional values (such as relative humidity) that should be calculated either by the sensors or by the processor; and, (iv) the "reporting frequency", which will control how often the processor activates the communication hub 215 and transmits compiled data to a remote computer.

STEP 3: A technician, project supervisor, or other worker will evaluate the communication options and resources that are available at that particular job site, and will take any steps or install any devices necessary to establish functional and reliable communications between the processor at the job site, and one or more remote computers, such as a desktop computer at the contractor's office, or a laptop computer that is carried around by a worker who monitors and supervises several active sites. Such communication can use, for example, hard-wired telephone lines and jacks, a wireless system such as a cell phone or rooftop antenna, or high-speed Internet access using any connections already available at the work site. Typically, before the technician leaves the site, a worker at a remote location will check out the connection, and go through a startup (or "shakedown") run to make sure that everything is working properly, and that a person at a remote computer can activate, run, and complete a "polling" cycle, which will cause the processor to gather current data from each and all of the sensors that are active at the site.

STEP 4: When everything is running and has been checked out, the actual monitoring will begin, and the technician who set up the system can leave the site, with the fans and dehumidifiers running. The on-site processor will "poll" the sensors at the specified timed intervals, and store the data that is gathered.

STEP 5: At various programmed times (usually very early in the morning, such as at 5 or 6 am), the on-site processor will take any initial steps (such as getting a dial tone for a modem or cell phone, logging onto the Internet, etc.) that are necessary to enable the transfer of data to the contractor's office computer, or to an e-mail address, website, or other location that will hold the data until it is downloaded by the contractor's office computer or by a project supervisor. The data will be transferred.

STEP 6: At any convenient time, or whenever a special message sent by the processor indicates a warning or alert that needs prompt attention, the project supervisor will review the data, and decide whether any changes should be made at that time. If one or more fans or blowers should be turned on or off, a signal can be sent by the project supervisor to the on-site controller, to activate a switch that will carry out the desired action. Based on the progress of the remediation, the project supervisor will decide when to send one or more workers to job site, to make any additional changes or to begin removing the equipment so it can be taken to another job site.

OPTIONAL STEP 7: If the processor detects that the target drying levels have been reached or are being approached, or if an unwanted condition is detected (such as a fan or dehumidifier not operating properly, when it should be running), the processor can send a warning or alert message alert to the contractor's computer, for evaluation and possible action by the project supervisor.

OPTIONAL STEP 8: The project supervisor (or anyone else with proper authority at the contractor's office) can use a remote computer to contact the on-site processor, to activate a new polling cycle that will obtain a new set of data from all of the active sensors. This will generate a report of the current conditions inside the building, at that point in time.

Remote Detector and Switch System

FIG. 4 provides a circuit diagram that can be used to create a detector-and-switch system 500 (hereafter referred to simply as switch 500, for convenience) which can be used to detect and control whether electrical power (presumably 60 hertz, 110-volt alternating current from a wall outlet) is being provided to a piece of power equipment such as a fan or dehumidifier.

This type of circuit can be incorporated into an enclosure that can be plugged directly into a wall outlet and secured to the wall by a screw, so that it will be out of the way and less likely to be accidentally kicked or stepped on, and less likely to be reached by water on the floor. If desired, two essentially identical circuits can be provided inside a single enclosure that can be plugged into and affixed to a standard wall outlet having two sockets, to allow each outlet of the double-switch device to monitor and control its own fan, dehumidifier, or other piece of equipment.

Alternately, three to eight copies of this type of circuit can be incorporated into a stand-alone device that will be comparable to a so-called "power strip". In this mode, a single large and heavy cord that is plugged into a wall outlet, and the device will provide three to eight outlets on the "power strip", each outlet having its own ability to monitor and control a fan, dehumidifier, or other piece of equipment. In general, because most typical 110 volt wall outlets are controlled by 15 or 20 amp circuit breakers, a monitoring and control device having several such circuits with individually monitored and controlled outlets generally should not have more than 3 or possibly 4 such outlets, under the control of a single circuit breaker. Alternately, in some cases, such monitoring and switching devices can be provided with more outlets if they are put under the control of a larger circuit breaker (which can be temporarily installed in a breaker panel by a qualified technician, for the duration of a remediation effort), or if they can be plugged into a 220 volt outlet, which may be conveniently available (or temporarily installable) near an oven, electric dryer, furnace, or other major appliance.

Referring to the circuit diagram in FIG. 4, switch device 500 will be plugged into a conventional 110-volt wall socket 540, via a heavy power cord and plug that are part of switch 500. It will control the power supply that is sent to a fan or other piece of equipment, via outlet 550, which also is built into switch 500.

In any standard outlet, such as in wall outlet 540, the smaller rectangular slot is wired to the "live" feed; the wire it is coupled to, inside the wall, is conventionally colored black, suggesting death if it is touched. The larger rectangular slot in the outlet is wired to a ground or reference feed; this wire is conventionally colored white, and it usually sustains a voltage close to the third ("ground") lead, which is conventionally colored green, or left exposed as a bare copper wire.

Within switch 500, capacitors C1 and C2, diodes D1 through D4 (which include bridge rectifier 512, "triac" device 518, and zener (also spelled xener) diode D3), transistors Q1 and Q2, resistors R1 through R7, and veristors V1 and V2 are conventional, with traits that will depend on each other and primarily on control module 510, as can be determined by any competent electrical engineer.

Control module 510 will be a selected and suitable type of microprocessor. One example that is familiar to those who work in this field is the ATOMEGA 8L microprocessor, sold by the Atmel company. This microprocessor can be loaded with software that has been written by a user (or a contractor that specializes in writing microprocessor software), in a manner that will allow the operating parameters to be adjusted and controlled for each specific job or project, by a technician who sets up the equipment at the job site, who knows and can take into account the equipment that will be used at that particular job. As an example, if the technician knows that a fan connected to switched outlet 550 normally runs at 3 amps, but can surge up to 5 amps for one or two seconds when first turned on, control module 510 can be programmed in a way that will allow the technician, at the start of a job, to respond to various prompts (provided by processor 210 (i.e., the laptop computer or similar device, as shown in FIG. 2) in ways that will cause processor 210 to carry out tasks that include sending an alert to a remote computer, pager, or other device, if any of certain events or conditions occur, other than in response to a specific override signal that was sent to switch 500 via processor 210. Events or conditions that can be programmed to trigger the sending of an alert signal might include, for example: (i) the current passing through outlet 550 exceeds 5 amps for more than 5 seconds, or (ii) the current passing through outlet 550 drops to less than 2 amps for more than 30 seconds.

Other components that deserve note in the circuit diagram in FIG. 4 include antenna 502 (which can send radiofrequency (RF) signals to, as well as receive RF signals from, a wireless network that is controlled by processor 210), "opto-isolator" assembly 514, and thermistor 516. In addition, a backup battery 520 can provide power that will be used by control module 510 to send a signal to processor 210, via antenna 502, if the electrical power, provided to switch 500 by wall outlet 540, is cut off.

It also should be noted that, if a microprocessor such as the ATOMEGA 8L is selected for use as control module 510, the voltage that will drive the microprocessor (i.e., the voltage differential between Vcc and "ground" voltage) will be about 7 volts, and the voltage that emerges from the microprocessor (in the line that leads to resistor R3) will be about 3.3 volts. If a different microprocessor is selected, its driving and output voltages will need to be taken into account.

It should be recognized that a separate miniaturized antenna (such as antenna 502 in switch 500, shown in FIG. 4) will be present on each of the numerous different power outlet monitoring and switching devices 500 that are being used during a job. For example, three different switches 500, each capable of monitoring and controlling a different fan or dehumidifier, are shown in FIG. 2, and each of those three switches has its own miniature antenna, for a total of three miniature antennas (the plural form can also be spelled antennae). By using different frequencies, different modulations, or various other arrangements known to those skilled in the art, this overall system will allow RF signals to be sent, in both directions, between job-site processor 210 (i.e., a laptop computer or similar device), and each microprocessor in each of the various different switching devices 500, in ways that allow the processor 210 to distinguish and identify the signals that are being sent by each different switch 500. Accordingly, processor 210 can provide a remote computer or operator with a complete record of the ongoing status of each and all of the switches 500, throughout the entire course of a remediation operation.

To the best of the Applicant's knowledge and belief, there are no devices currently available that will allow a computer, which is positioned at a remote job site and which has been provided with a telephone, cell phone, internet, or other linkage to a remote computer or website, to be used to monitor and control the power that is being provided to various items of electrically-powered equipment, at a remote job site. Accordingly, the designs and arrangements shown in FIGS. 2 and 4 are believed to provide important advances and benefits, in systems that can be used not just for water remediation efforts, but which also can be adapted in various ways for various types of other and additional types of convenient and cost-effective monitoring and management of power equipment operating at a remote job site.

In addition, it should be noted that the device shown in FIG. 4 (which includes a sophisticated but inexpensive microprocessor that can be custom-programmed in ways that can accommodate a wide variety of needs and goals) can provide a complete job-site system that is powerful, intelligent, and highly adaptable, for enabling and carrying out a range of automated, responsive, and adaptable and programmable monitoring and control activities that cannot be accomplished, in the relevant prior art.

As used herein, the relevant prior art is deemed to be limited to automated monitoring and control systems that meet both of the following criteria:

(i) such systems must be lightweight and highly portable, in a manner that will allow them to be carried to a job site in a car or pickup truck, and set up and run, within roughly two hours or less, by one or two semi-skilled workers; and, (ii) such systems must be inexpensive, and affordable to contractors who handle work such as basement cleanups and mold remediation.

These two criteria specifically exclude the types of complex and expensive monitoring and control systems that are used at large and expensive stationary facilities, such as refineries, chemical plants, power generation facilities, hospitals, etc. Powerful, complex, and sophisticated computer monitoring systems have been developed for such facilities, and those types of expensive stationary systems can easily outclass and outperform the types of monitoring and control systems disclosed herein. However, those types of monitoring and control systems do not and cannot meet and satisfy the needs of small companies and individual contractors, who must be able to handle jobs that require equipment to be hauled to a job site, set up within an hour or two, run for a day or more, and then disassembled, removed, and taken to the next job site, conveniently, effectively, and inexpensively. Accordingly, the monitoring and control system disclosed herein is designed and intended primarily to serve that type of niche, and it must be evaluated by comparing it, not to the types of monitoring and control systems used in large fixed facilities, but by comparing it to what is available to contractors who do residential or commercial water, mold, or similar remediation and cleanup, at numerous different job sites.

Accordingly, the term "portable" is used and intended herein to distinguish the devices and systems herein from various other systems that have been designed and used for stationary installations (such as refineries, power plants, hospitals, etc). A "portable" device, as used herein, refers to and is limited to a class of devices that can be taken in a car or truck to a new job site, set up in a rapid and convenient manner (such as within 2 hours or less, by 2 people or less; in fact, the entire system herein likely can be set up in roughly 30 minutes by a single worker, who will require some level of training, but not extensive and exhaustive training). While portable systems clearly can be used for any desired length of time at any site where they are installed, the fact that they are portable renders them highly useful and valuable for various types of work, since they can be transported easily to a series of different job sites, allowing these systems to provide substantial benefits, at low cost, wherever they may be needed.

It should also be recognized that the types of devices, job-site networks, and systems disclosed herein can be adapted for various other types of work and use (including but not limited to work done by contractors at a series or set of different sites, using devices and systems that are easily portable and that can be moved easily and rapidly to any location where they are needed). As just one example of such potentially expanded uses, the sensor-switches 500 described herein can be used for turning nearly any desired type of computer, still camera, and/or video camera (and an accompanying and supporting lighting system) on and off, either automatically under remote control, whenever desired, using a combination of (i) a main on-site processor that can be a full-scale computer which has been programmed in essentially any way desired, and combined with (ii) smaller satellite "sensor-switches" that contain inexpensive but programmable microprocessors.

Similarly, the types of relatively inexpensive and portable sensor-switches and devices disclosed herein (and, if desired, even simpler and less expensive sensor-switches that, in many cases, will not need to contain a programmable microprocessor) can also be adapted form various types of residential and office use, to allow anyone who has the tools and knowledge to control such a system to be able to remotely detect and monitor which outlets and devices are turned off, and on. For example, in home or apartment settings, most modem building codes usually require any electrical outlet that is within 6 feet of a water supply (such as in kitchens, bathrooms, and utility rooms, as well as all outdoor outlets) to be a "ground fault interrupt" (GFI) type of outlet, to reduce the risk of electrocution or injury. In a similar manner, sensor-switched outlets can be installed at various selected locations, distributed throughout a home or apartment. For example, this could allow a person at any location (such as a person carrying a laptop computer with a cell phone hookup) to check and see whether an iron or other potentially dangerous appliance was left turned on, when the person left the house. Similarly, it could allow parents to determine, from any computer, whether their kids are watching television or playing video games, when they are supposed to be doing homework instead; and, it could allow a person to silently and remotely turn on one or more video cameras and begin storing the images, to find out what is happening in a home, apartment, or other location if an alarm signal has been activated.

Thus, there has been shown and described a new and useful set of devices, systems, and methods for remote monitoring and control of power equipment that must be taken to various different job sites, such as in remediation efforts in buildings that have been damaged by water, mold colonies, etc. Although this invention has been exemplified for purposes of illustration and description by reference to certain specific embodiments, it will be apparent to those skilled in the art that various modifications, alterations, and equivalents of the illustrated examples are possible. Any such changes which derive directly from the teachings herein, and which do not depart from the spirit and scope of the invention, are deemed to be covered by this invention.

The invention claimed is:

1. A portable system to facilitate monitoring of remediation work at a work site, comprising:
   a. at least one programmable processor that can be placed and operated at a work site and that contains or interacts with:
      (i) at least one data transfer device that enables data to be transferred from said work site to a remote computer at a different site;
      (ii) means that enable said programmable processor to receive data from at least one sensor that is positioned at the work site; and,
      (iii) a memory array that enables said programmable processor to record and store data from at least one sensor; and,
   b. at least one sensor that can measure at least one local condition that will change, as remediation work is done at a work site, in a manner that correlates with desired progress of said remediation work at the work site, wherein said sensor is provided with means for transmitting data on said local condition to said programmable processor, when said portable system is operating at the work site.

2. The portable system of claim 1, wherein at least one sensor measures temperature and humidity, and wherein said portable system can be used for remote monitoring of progress in remediating water-related damage.

3. The portable system of claim 2, comprising:
   (i) a plurality of sensors that can be positioned at spaced locations around the work site; and,
   (ii) means that enable said plurality of sensors to transmit data from each sensor to said programmable processor, in a manner that enables the programmable processor to correlate each set of data with a specific sensor which collected that data,
   and wherein said programmable processor is also provided with a memory array that enables said programmable processor to record and store data sets from a plurality of sensors, in a manner that correlates each data set with a specific sensor which collected that data set, when said portable system is operating at the work site.

4. The portable system of claim 1, wherein at least one data transfer device that allows data to be transferred from said programmable processor to a remote computer at a different site utilizes wireless transmission of signals.

5. The portable system of claim 1, wherein at least one data transfer device that allows data to be transferred from said programmable processor to a remote computer at a different site enables transmission of data to a website.

6. The portable system of claim 1, wherein said means that enable said programmable processor to receive data from at least one sensor positioned at the work site comprise wireless means.

7. The portable system of claim 1, where said portable system also comprises at least one sensor-switch device that allows said programmable processor to:
  a. determine whether current is being sent to at least one powered device;
  b. transmit information to a remote computer at a different site, indicating whether current was being sent to at least one powered device at an indicated time; and
  c. enable a human operator at a remote location to send one or more signals to said programmable processor in a manner that causes said sensor-switch device to (i) provide current to said powered device, when desired by said operator, or (ii) terminate any current that is being provided to said powered device, when desired by said operator.

8. A system that enables remote monitoring and control of water remediation work at a work site, comprising:
  a. at least one programmable processor that can be placed and operated at the work site and that contains or interacts with:
    (i) at least one data transfer device that enables data and signals to be transferred from said work site to a remote computer at a different site; and,
    (ii) means that enable said programmable processor to receive data from at least one sensor positioned at the work site; and,
  b. at least one sensor that can measure temperature and humidity, wherein said sensor is provided with means for transmitting data to said programmable processor,
wherein all of components are portable and suited for convenient transport to a series of differing work sites, and wherein said components are suited for remote monitoring and control of electric-powered drying equipment at locations that have suffered water damage.

9. The system of claim 8, comprising:
  (i) a plurality of sensors that can be positioned at spaced locations around a work site; and,
  (ii) means that enable said plurality of sensors to transmit data from each sensor to said programmable processor, in a manner that enables the programmable processor to correlate each set of data with a specific sensor which collected that data, and wherein said programmable processor is also provided with a memory array that enables said programmable processor to record and store data sets from a plurality of sensors, in a manner that correlates each data set with a specific sensor which collected that data set, when said portable system is operating at the work site.

10. A sensor and switching device, comprising:
  a. means for conveying, in a switch-controlled and interruptible manner, current from an electrical current supply, to a switch-controlled outlet that can be used to provide electrical power to a powered device designed for remediation work at a work site;
  b. sensor means for detecting whether current is passing through said switch-controlled outlet to a powered device;
  c. a programmable microprocessor within said sensor and switching device, which has been loaded with software that has been written to enable the sensor and switching device to exchange signals with a processor that is designed to interact with at least one sensor and switching device; and,
  d. an antenna component designed to transmit wireless signals in either direction between said sensor and switching device, and said processor.

11. A sensor and switching system that can be monitored from a remote location, comprising:
  a. a processor designed to process and transmit signals from each sensor-switch device among a plurality of sensor-switch devices; and,
  b. a plurality of sensor-switch devices, each of said sensor-switch devices comprising:
    (i) means for conveying, in a switch-controlled and interruptible manner, current from an electrical current supply, to a switch-controlled outlet that can be used to provide electrical power to a powered device;
    (ii) sensor means for detecting whether current is passing through said switch-controlled outlet to a powered device; and,
    (iii) means for conveying signals between said sensor-switch device and said processor,
  and wherein said processor is also provided with means for:
    (a) polling any sensor-switch device within said plurality of sensor-switch devices, to determine whether such device is providing electrical current to a powered device, when such polling is activated by a human operator at a remote site; and,
    (b) transmitting information to a human operator at a remote site, indicating whether a polled sensor-switch device was providing electrical current to a powered device when said sensor-switch device was polled by said processor.

12. The sensor and switching system of claim 11, wherein the system is also provided with means that will enable a human operator at a remote location to send one or more signals to said processor in a manner that causes a specific targeted sensor-switch device to (i) provide current to a powered device, when desired by said operator, or (ii) terminate any current that is being provided to said powered device, when desired by said operator.

* * * * *